Dec. 3, 1968
J. W. CARTER
3,414,453
APPARATUS FOR MAKING LAMINATED WEBS OF FILAMENTARY
REINFORCING MATERIAL
Filed Dec. 11, 1964
4 Sheets-Sheet 2
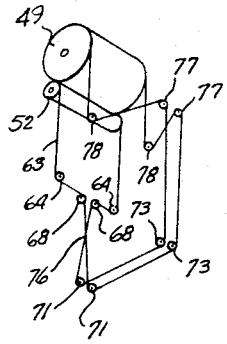
FIG. 12.
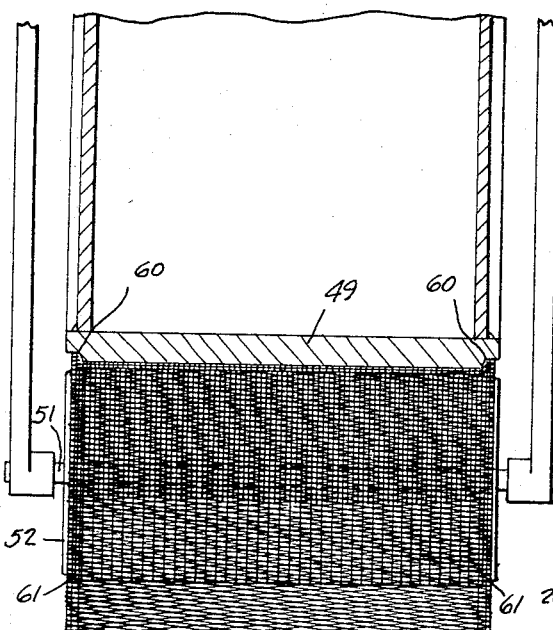
FIG. 2.
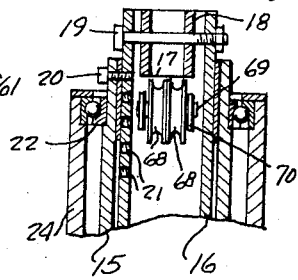
FIG. 2ª.
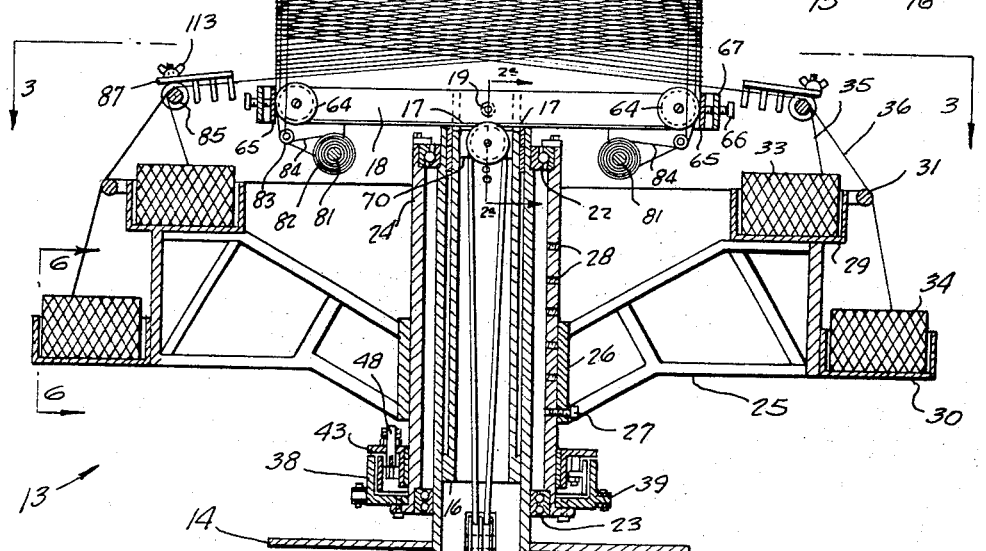
INVENTOR.
J. WARNE CARTER,
BY
Berman, Davidson & Berman
ATTORNEYS.

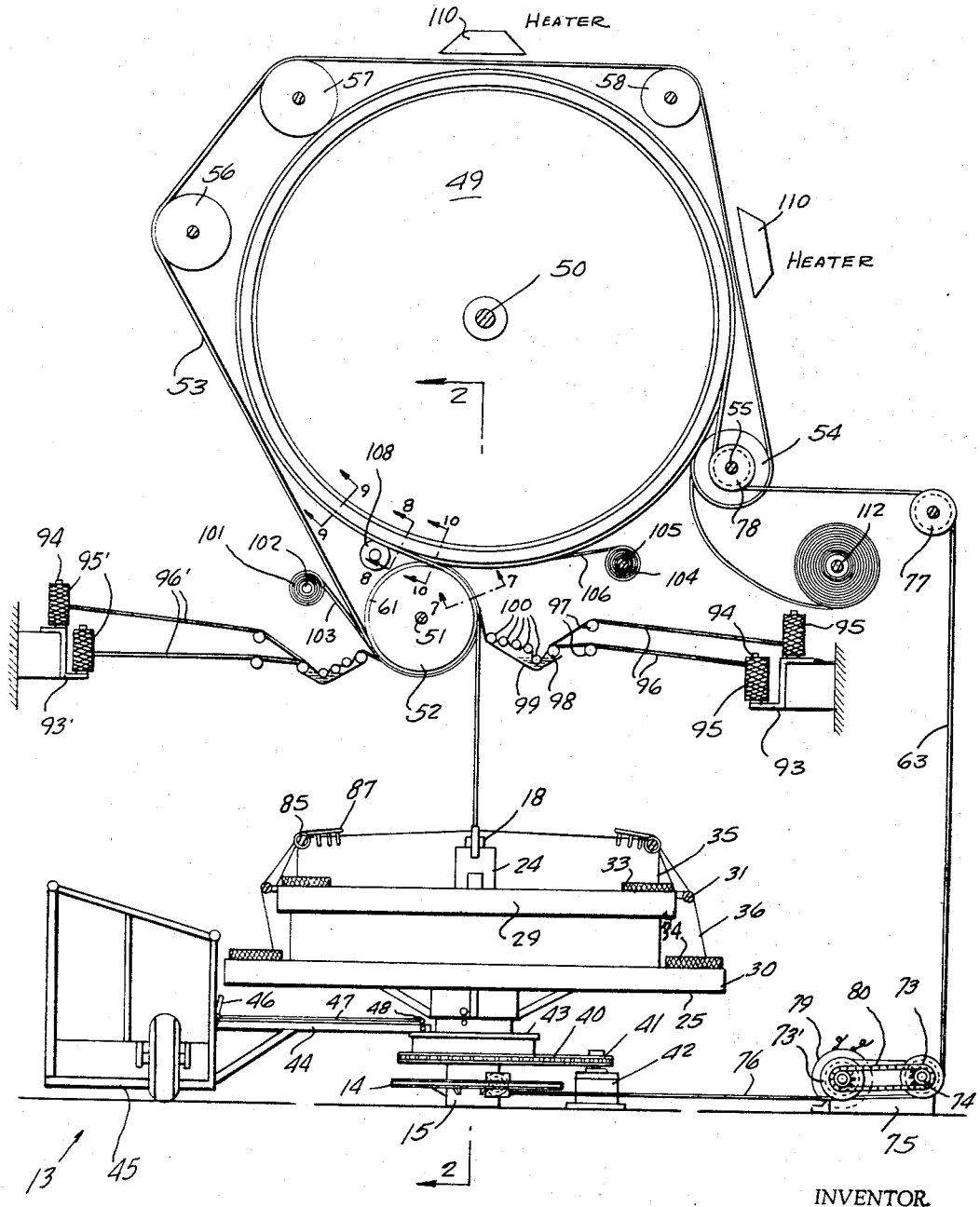

FIG. 3.
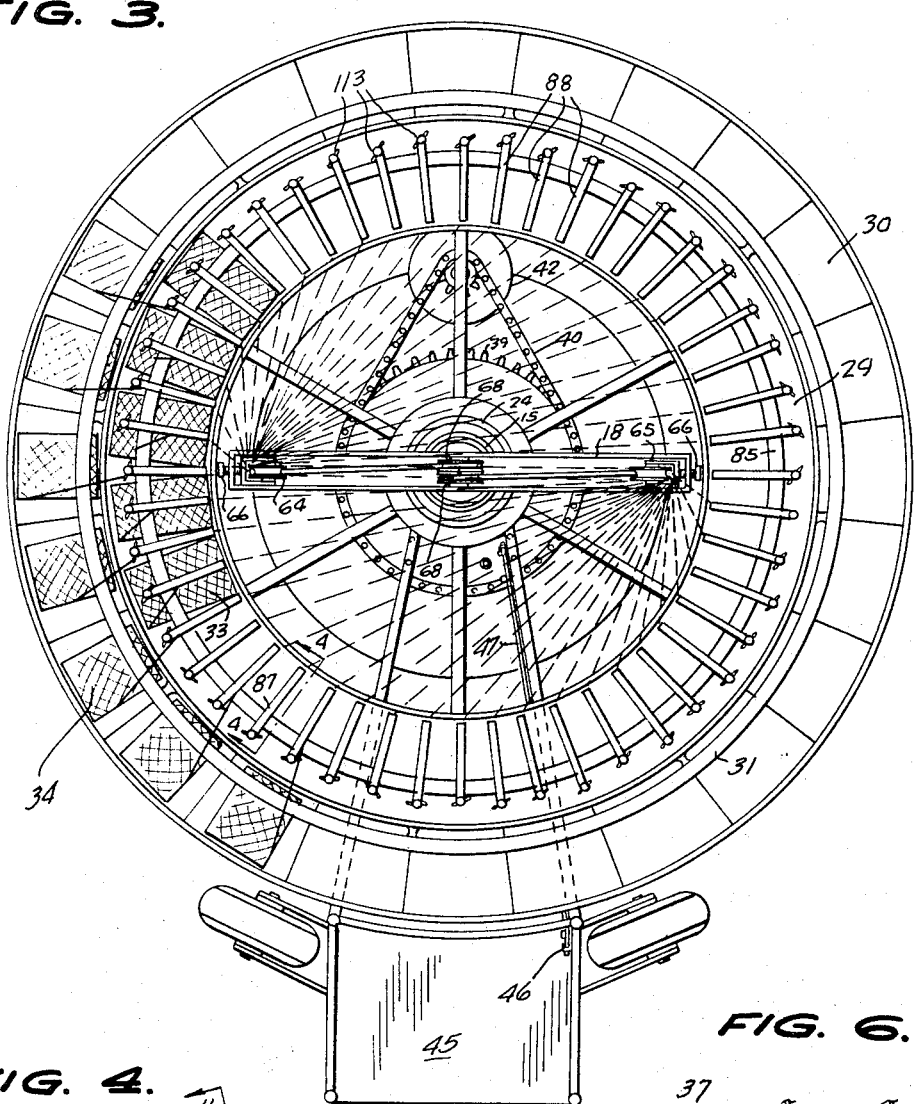
FIG. 4.
FIG. 6.
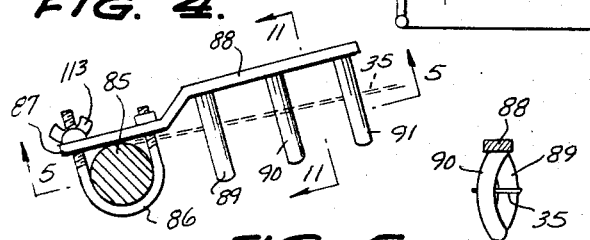
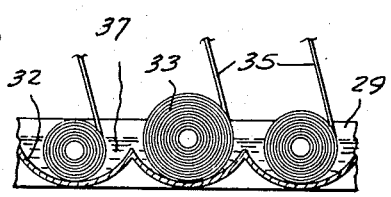
FIG. 5. FIG. 11.
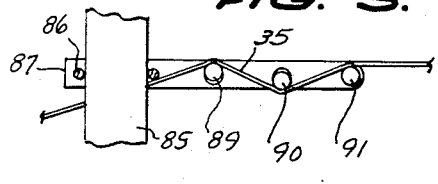
INVENTOR.
J. WARNE CARTER,
BY
Berman, Davidson & Berman
ATTORNEYS.

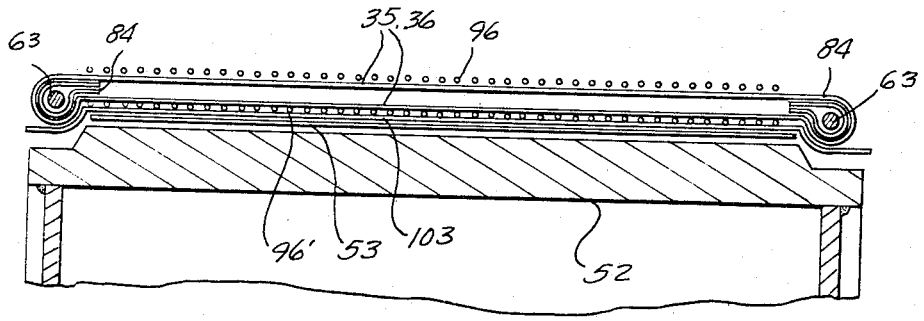
FIG. 7.
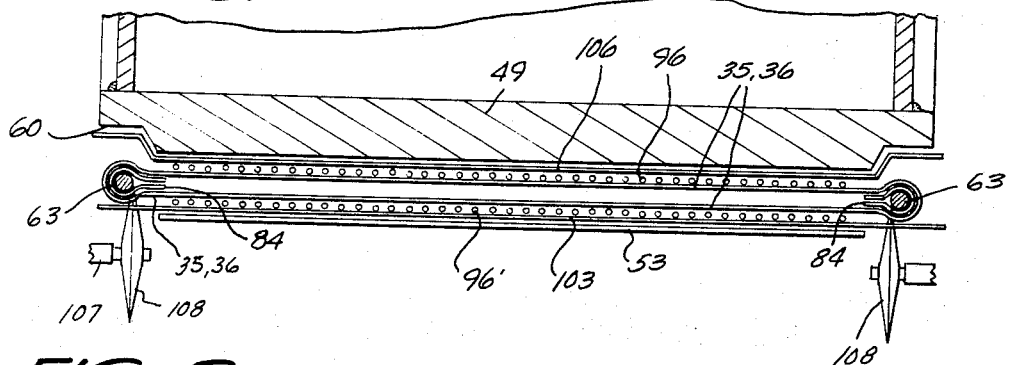
FIG. 8.
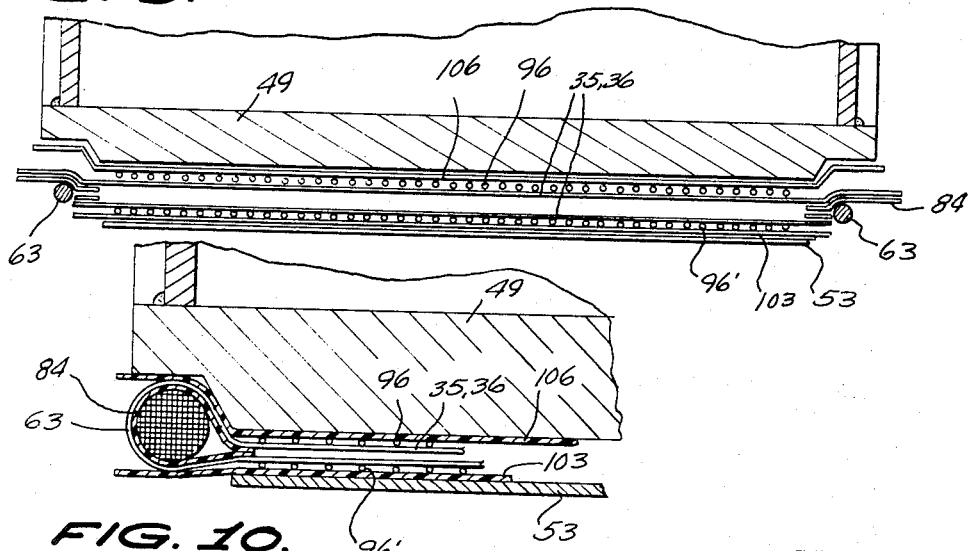
FIG. 9.
FIG. 10.

United States Patent Office 3,414,453
Patented Dec. 3, 1968

3,414,453
APPARATUS FOR MAKING LAMINATED WEBS OF FILAMENTARY REINFORCING MATERIAL
J. Warne Carter, 2206 Weeks Park Lane, Wichita Falls, Tex. 76308
Filed Dec. 11, 1964, Ser. No. 417,638
24 Claims. (Cl. 156—426)

ABSTRACT OF THE DISCLOSURE

A machine for making laminated webs from plastic filamentary strands consisting of a base having a hollow upstanding tubular post with a platform pivoted to the post. A table is journaled on the top end portion of the post carrying spools of plastic strands. A horizontal rotary drum is mounted above the post. A cross-arm is mounted on the top end of the post. An endless cable has a loop portion extending through the post, where it is crossed, with the two sides of the cable engaging drive pulleys and extending around opposite end portions of the drum, downwardly therefrom, and thence inwardly and down through the post, driven so that the side portions of the cable subjacent the drum move simultaneously upwardly at the same rate. The table is rotated while strands are fed to the upwardly-moving side portions of the cable causing the strands to cross and overlap. An endless clamping belt engages over the drum, and additional strands are fed respectively under and over the overlapped strands to form inside and outside longitudinal additional layers of strands. Protective flexible edge strips are fed through the opposite side portions of the cable underlying the strands, being severed as the laminated web moves between the clamping belt and the drum. Additional inside and outside removable flexible cover strips are fed to the web as it moves between the clamping belt and the drum. Heaters act on the web as it moves around the drum. The completed web is rolled up on a receiving roller.

This invention relates to apparatus for fabricating laminated webs of reinforced plastic material, and more particularly to a machine for making webbed sheets of thin reinforced plastic material of the type comprising overlapping layers of reinforcing filamentary material.

A main object of the invention is to provide a novel and improved machine for making laminated webs of thin reinforced plastic material comprising a plurality of layers containing strands of filamentary reinforcing material, the machine being relatively simple in construction, being reliable in operation, and being adapted to operate continuously to provide laminated webs of any desired length.

A further object of the invention is to provide an improved machine for fabricating laminated reinforced plastic sheet material in the form of a continuous web, the machine involving relatively inexpensive parts, being easy to maintain in proper operating condition, being relatively compact in size, and providing extremely economical and efficient utilization of the component materials employed in fabricating the laminated plastic sheets produced thereby.

A still further object of the invention is to provide an improved apparatus for fabricating laminated plastic sheets of material comprising layers of side-by-side filamentary strands which are arranged in overlapping relationship and which are bonded together and cured during the fabrication thereof on the machine, the apparatus providing a high degree of uniformity of the finished product obtained thereby, being adapted to operate over long periods of time without interruption, being easily adjustable so as to provide different crossing angles of the intermediate multiple-strand laminations of the sheet material formed thereby, and requiring a minimum number of personnel to operate it and to maintain it in proper working condition.

Further objects and advantages of the invention will become apparent from the following description and claims, and from the accompanying drawings, wherein:

FIGURE 1 is a diagrammatic side elevational view, partly in transverse vertical cross section, of an improved continuous-filament laminated plastic fabricating machine constructed in accordance with the present invention.

FIGURE 2 is an enlarged vertical cross sectional view taken substantially on the line 2—2 of FIGURE 1.

FIGURE 2a is an enlarged fragmentary vertical cross sectional view taken substantially on the line 2a—2a of FIGURE 2.

FIGURE 3 is a horizontal cross sectional view taken substantially on the line 3—3 of FIGURE 2.

FIGURE 4 is an enlarged cross sectional detail view taken substantially on the line 4—4 of FIGURE 3.

FIGURE 5 is a fragmentary cross sectional view taken substantially on the line 5—5 of FIGURE 4.

FIGURE 6 is an enlarged fragmentary vertical cross sectional view taken substantially on the line 6—6 of FIGURE 2.

FIGURE 7 is an enlarged fragmentary cross sectional view taken substantially on the line 7—7 of FIGURE 1.

FIGURE 8 is an enlarged fragmentary cross sectional view taken substantially on the line 8—8 of FIGURE 1.

FIGURE 9 is an enlarged fragmentary cross sectional view taken substantially on the line 9—9 of FIGURE 1.

FIGURE 10 is an enlarged fragmentary cross sectional view taken substantially on the line 10—10 of FIGURE 1.

FIGURE 11 is a cross sectional view taken substantially on the line 11—11 of FIGURE 4.

FIGURE 12 is a diagram illustrating the configuration of the single endless strand-supporting cable employed to support the intermediate overlapping plastic strands in the laminated web-forming apparatus of FIGURES 1 to 11.

Referring to the drawings, 13 generally designates an improved continuous filament winding and laminating machine constructed in accordance with the present invention. The machine 13 comprises a stationary base 14 which includes an upstanding vertical hollow tubular post member 15. Telescopically received in the secured within the post 15 is a tubular inner sleeve member 16 which projects a short distance above the top end of the stationary post 15 and is formed with diametrically opposed notches 17, 17 which receive a horizontal cross arm 18. The cross arm 18 is secured to the top end of the inner sleeve member 16 by a fastening both 19. It will be seen from FIGURE 2a that the sleeve member 16 is adjustable relative to the stationary post member 15 and is secured in an adjusted position by means of a fastening bolt 20 engaging through an aperture in the top portion of member 15 and being selectively threadedly engageable with any one of a series of vertically spaced tapped holes 21 provided in the sleeve member 16. Thus, the height of the cross arm 18 above the top end of the fixed post member 15 may be adjusted, within the range permitted by the series of spaced tapped holes 21.

Rotatably supported on the fixed post member 15, as by top and bottom bearing assemblies 22 and 23 is an outer sleeve member 24 to which is adjustably secured the table assembly 25. Thus the table assembly 25 includes a central hub or sleeve 26 which is engaged slidably on the sleeve member 24 and which is adjustably secured thereto by a bolt 27 which is threadedly engageable in any one of a series of vertically spaced tapped holes 28, permitting the table member 25 to be supported at an adjusted height along the fixed post member 15.

The table 25 comprises a frame structure on which are mounted the concentric, generally annular upper and lower trough members 29 and 30, arranged as shown in FIGURES 2 and 3, with the upper trough member 29 somewhat smaller in diameter than the lower trough member 30, and with a guide ring 31 mounted adjacent to and outwardly spaced from the upper trough member 29. The trough members 29 and 30 are provided with upwardly concave arcuately-shaped generally radially extending compartments 32 containing respective glass fiber packages or rolls 33, 34 which are freely rotatable, allowing the respective glass fiber strands 35 and 36 to be unwound therefrom. The troughs contain resin material 37 in which the packages 33 and 34 are immersed, so that the emerging strands 35 and 36 are impregnated with the polymerizable resin 37.

Secured to the bottom end of the outer sleeve member 24 is an annular drum element 38 formed with outwardly projecting sprocket teeth 39 at the bottom portion of its periphery, said sprocket teeth being drivingly engaged by an endless sprocket chain 40 which in turn is drivingly engaged on the drive sprocket 41 carried by the shaft of a vertical electric motor 42 mounted adjacent the post member 15, as shown in FIGURE 1. Thus, the motor 42 drives the drum 38 through the sprocket chain 40, the driving sprocket 41 being substantially smaller in diameter than the diameter of the drum 38, so that the drum 38 is driven at a relatively slow speed as compared with the speed of the shaft of motor 42.

Rotatably mounted on the lower portion of the sleeve member 24 is a clutch ring 43 which is connected by a radially extending arm 44 to a wheeled platform 45 located adjacent the periphery of the lowermost annular trough 30, the platform being adapted to carry an attendant who is responsible for the supervision of the machine. Conventional clutch means is provided for at times coupling the ring 43 to the drum 38, said clutch means including a control lever 46 pivoted to the arm 44 adjacent the platform 45 and connected by a link rod 47 to a pivoted clutch element 48 which may be moved into interlocking relationship wth conventional cooperating clutch elements in the drum 38 responsive to the actuation of the lever 46. This enables the attendant to lock the platform 45 to the table 25 at any desired position thereof, thus enabling the attendant to change packages 34 or 33, as required, or to perform any other necessary adjustment or servicing operations on the machine which can be performed while the table 25 is rotating.

Designated at 49 is a relatively large cylindrical drum which is rotatably mounted above the table 25 on a transversely extending horizontal shaft 50 suitably supported in stationary bracket means not shown, and rotatably mounted subjacent the large drum 49 on a shaft 51 parallel to the shaft 50 is a smaller drum 52. A flexible endless belt 53 extends around the drum 52 and around the opposite supporting drum 54 rotatably mounted on a shaft 55 extending parallel to the shaft 51. The upper run of the belt 53 extends over supporting idler rollers 56, 57, and 58 spaced adjacent to the top of the drum 49 on axes parallel to the shaft 50 and the lower run of the belt 53 extends over drum 49 and is supported thereon, whereby the lower run of the belt 53 exerts clamping force against the drum 49. The large drum 49 is provided at its peripheral edges with annular recesses 60, 60, and the smaller drum 52 is provided at its opposite ends with similar annular recesses 61, 61 aligned with the recesses 60, 60. An endless cable 63 drivingly connects the drums 49 and 52 for simultaneous rotation in a manner presently to be described, the cable being received in the aligned end recesses 60 and 61 of the drums.

Cable 63 extends around respectively guide pulleys 64, 64 provided in the opposite end portions of the cross arms 18. The pulleys 64 are journaled in respective yoke members 65, 65 (see FIGURES 2 and 3) adjustably and slidably mounted in the opposite end portions of the cross arm 18, the yoke members being rotatably secured axially to and supported on respective adjusting screws 66, 66 (FIGURE 3) threadedly engaged through the opposite end walls 67 of the cross arm 18.

The cross arm 18 is in the form of a rigid elongated rectangular loop having the aforesaid end walls 67 and the yoke members 65 are slidably disposed in the end portions of the loop with the adjusting screws 66 rotatably secured to the vertical bight portions of the U-shaped yoke members 65 whereby the yoke members are adjustable longitudinally in the arm 18 as the adjusting screws 66 are rotated. This provides a range of longitudinal adjustment of the guide pulleys 64, 64 in the cross arm 18.

From the pulleys 64, 64, the cable 63 extends from opposite sides over a pair of guide pulleys 68, 68 rotatably mounted on a common shaft 69 transversely secured between parallel bracket members 70 (FIGURE 2) rigidly fastened inside the top portion of sleeve member 16, whereby the cable is effectively crossed, as shown at 76 in FIGURE 12. From the pulleys 69 the cable extends downwardly and passes over guide pulleys 71, 71 rotatably mounted in the lower portion of the post member 15 adjacent an aperture 72 in the wall of the post member, the cable passing outwardly through said aperture and extending around guide pulleys 73, 73 rigidly secured together on a common shaft 74 journaled on a suitable supporting bracket 75 spaced outwardly from the base 14, as shown in FIGURE 1. The cable 63 extends upwardly from the driving pulleys 73, passing over idler pulleys 77, 77 and under additional idler pulleys 78, 78 located adjacent the drum 49, passing thence to the annular drum recesses 60, 60.

The shaft 74 is driven in a clockwise direction, as viewed in FIGURE 1, by an electric motor 79 whose shaft is coupled by a sprocket chain 80 engaged over respective sprocket wheels carried on the motor shaft and on the shaft 74. The clockwise rotation of shaft 74 drives the cable so that the respective side portions of cable 63 between guide pulleys 64 and drum 52 move upwardly in the same direction and at the same speed. As shown in FIGURE 1, the guide pulleys 78 may be mounted on the same shaft as the endless belt supporting roller 54, namely, the shaft 55.

It will be understood that the drawings are essentially schematic and that the various shafts, guide pulleys, rollers, and other elements shown schematically in FIGURE 1 are suitably supported on the structural frame of the machine, not shown, and that the main drum 49 is likewise supported on suitable frame means rigid with the frame structure, also not shown.

From the above description, it will be apparent that clockwise rotation of shaft 74 drives the cable 63 in a direction such that the side elements of the cable located between guide pulleys 64 and roller 52 move upwardly, and at the same speed, as above mentioned.

Suitably mounted below the cross arm 18 and inwardly adjacent the opposite ends thereof are respective freely rotatable shafts 81, 81 carrying rolls 82 of cellophane webbing, said webbing being fed beneath guide rollers 83 so as to pass between the vertical bight portions of the yoke members 65 for pulleys 64 and the peripheries of the pulleys so as to be applied against the vertical upwardly extending side elements of cable 63 as said elements move upwardly from the guide pulleys 64 toward the drum 52. The cellophane strips, shown at 84, cover the cable side elements so as to protect said cable side elements from direct contact with the resin-impregnated glass strands from the supply packages 33 and 34 as said strands are wound around the cable elements responsive to the rotation of table 25. The resin-coated glass strands 35 and 36 engage over a horizontal guide ring 85 spaced above and concentrically mounted with respect to the lower guide ring 31, the ring 85 being suitably rigidly secured to the structure of the table 25 in the position illustrated in FIGURE 2. Clamped to the ring 85 by U-bolts 86 are respective inwardly extending guide arms 87 having upwardly offset inner end portions 88 provided with depending, spaced, guide fingers 89, 90 and 91, as shown in FIGURES 4 and 5. The intermediate guide finger 90 is bowed in the direction opposite to the direction of arcuate curvature of the bowed finger 89, and the resin-coated strands 35 and 36 are threaded through the guide fingers in the manner illustrated in FIGURE 5 alternately engaging the convexly curved outside surfaces of the guide fingers, whereby the tension in the strands presses the strands against said convexly curved outside finger surfaces and removes excess resin therefrom, the resin dropping into the subjacent annular trough 29. The strands leaving the straight final guide fingers 91 are applied around the parallel side portions of cable 63 and are wound thereon at an angle of inclination depending upon the speed of rotation of table 25 relative to the speed of movement of cable 63.

It is desirable to maintain the shortest possible distance between the support pulleys 64, 64 and the points of tangency of the elements of cable 63 engaging drum 52, in order to minimize the amount of required tension in the cable. A sufficient tension must be maintained in the cable to prevent excessive sagging of the wet reinforcing strands or filaments, whereby to maintain uniform distribution of said strands or filaments during fabrication of the webbing.

For a selected angle of inclination the machine may be adjusted to provide said shortest possible distance by suitably selecting the tapped opening 28 receiving the fastening screw 27, which regulates the height of table 25, and by suitably selecting the tapped opening 21 which receives the fastening screw 20, which regulates the height of the cross arm 18 above the top end of the stationary post member 15.

Rotatably mounted on suitable brackets 93, 93', provided with vertical supporting spindles 94 are respective additional supply packages 95, 95' of glass strand material, the strands 96, 96' therefrom being fed over suitable guide bars 97 and 98 into a resin trough 99 and alternately around spaced horizontal fingers 100 which remove excess resin from the strands, being fed therefrom on the respective opposite sides of the superimposed layers of strands wound on the side elements of cable 63 located between guide pulleys 64 and drum 52. Thus, the resin-coated additional layers of strands 96, 96' are applied to the opposite sides of the previously superimposed layers of strands supplied from the packages 33 and 34. The respective outside layers of strands 96, 96' are applied longitudinally over the substantially transversely extending superimposed or crossed inside layers of strands 35, 36. A first supply roll 101 of cellophane webbing is rotatably mounted on a horizontal spindle 102 arranged parallel to shafts 50 and 51 and located adjacent the left side portion of belt 53, as viewed in FIGURE 1, and adjacent the drum 52, the webbing material from roll 101, shown at 103, being fed between the outer run of belt 53 and the strands 96' from the supply packages 95' located at the left side of the machine, as viewed in FIGURE 1. The strands 96' form the outermost layer of strand material applied to the drum 52, but the webbing 103 is located outermost when the material advances onto the drum 49. A similar supply roll 104 of cellophane webbing is rotatably mounted on a horizontal spindle 105 located subjacent to and at the right side of the drum 49, the cellophane webbing material 106 from supply roll 104 being fed against the surface of the drum 49 and thus being interposed between the layer of strand material formed by the strands 96 and the drum surface.

The protective layers of cellophane webbing 103 and 106 may be removed after the laminated material has been fully cured, or at any other suitably convenient time.

Mounted on horizontal spindles 107 parallel to the shaft 50 and located subjacent to drum 49 and adjacent the grooves 60 thereof are respective cutter discs 108, located immediately past the drum 52, in the direction of travel of the laminated material moving therefrom onto the drum 49. The cutter discs 108 are positioned to sever the looped portions of laminated material carried on the respective side portions of cable 63, namely, the lowermost layer of strand material 35, 36 previously wound on the table side portions and also the protective strips of cellophane 84, as shown in FIGURE 8. This releases the laminated material as it is fed to the drum 49, so that it is free to be unwound from the drum after passage thereover.

The inner run of the endless belt 53 applies clamping pressure against the laminated material as it moves over the surface of the drum 49, compressing the laminations of resin-impregnated glass fibre. At the same time, heat may be applied to the laminations by the provision of suitable heaters 110 spaced around the drum, whereby the resin is polymerized, either partly or completely, as desired. The cured or partly cured laminated product finally passes from between the inner run of endless belt 53 and the surface of drum 49 at the belt-supporting roller 54 and is wound on a suitable take-up roll 112.

The small drum 52 serves a highly important purpose, since it has a much smaller radius of curvature than the main drug 49 and hence radial compaction force is applied to the resin-impregnated glass strands passing therearound, which considerably aids in the working of the resin and the removal of trapped air therefrom. The laminated material progressively comes into contact with the surface of drum 52, thus allowing air to be progressively moved in steps from laminated glass-resin mass. After the mass is in position on the drum 52, it passes around said drum and is squeezed between the surface of drum 49 and drum 52, removing the final traces of air in the laminate, as well as providing effective compaction. The endless belt 53 maintains the laminate in its compacted condition and suitably supports it so that the cutters 108, 108 can operate efficiently to release the laminate from the said elements of cable 63. As the laminate continues to progress around on the surface of the drum 49, heat is applied thereto, as above mentioned, so that the laminate may be either fully polymerized, if so desired, before removal from between belt 53 and drum 49, or may be nearly polymerized by merely reducing the amount of heat applied. After being thus processed the finished laminate is rolled up on the storage drum 112 with the cellophane protective strips 103 and 106 covering its opposite sides.

By the above described arrangement, the laminate may be removed either as a wet laminate, partially cured, or in a fully cured condition. If the material is incompletely cured, it may be subsequently passed through molds of the conveyor type, or be corrugated or otherwise formed to any desirable shape. It may also be stored on the take-up roll 112 until needed for other manufacturing purposes at a later date.

As above mentioned, the strands 96 and 96' pass through the resin bath 99 containing the stationary guide fingers 100 with the strands passing alternately against said guide fingers, as shown in FIGURE 1, so that the fingers act to remove excess resin and flatten the strands. When additional strands are required in the outer layers, the additional strands are fed in between the strands 96 and 96' as they converge from the guide rings 97 toward the trough 99.

Since a relatively large force is required to pull the laminated material around the main drum 49, and since this force is provided by the cable 63 and the drive pulleys 73 and 73', associated with shaft 74 and motor 79, as shown in FIGURE 1, the respective side elements of the cable may be wound several times around the drive pulleys 73 and 73' in order to develop sufficient frictional force to adequately drive the cable.

The guide pulleys 77 are preferably adjustably mounted, so that they may be employed to provide the correct tension in cable 63.

As above mentioned, an important advantage of employing a single cable 63 is that the respective side elements of the cable between the guide pulleys 64 and the drum 52 moves at exactly the same speed and in the same direction and that it is impossible for one of said guide elements to slip or move at a rate different from that of the other side element. Furthermore, it is relatively easy to maintain proper tension in the cable, since this merely requires adjustment of the position of the guide pulleys 77.

As previously mentioned, the guide pulleys 64 are adjustable inwardly or outwardly by means of the rotatable adjusting screws 66. Adjustment of the pulleys 64 changes the distance between the side elements of cable 63. This adjustment is necessary in order that the glass strands have the correct tension when they advance toward the drum 52.

It will be noted that the arms 87 are fastened to the supporting ring 85 by the U-bolts 86 with the provision of a wing nut 113 on one of the legs of the bolts. Each arm 87 may therefore be easily adjusted to its proper angular position and locked in said position by tightening the associated wing nut 113.

As previously mentioned, the fingers 89 and 90 on each arm 87 are arcuately curved. However, the outermost finger, namely, the finger 91, is preferably straight, as shown in FIGURE 5.

In operation, the table 25 rotates at a constant speed around the vertical post member 15 around the respective tensioned guide elements of cable 63 supported between the guide pulleys 64, 64 and the drug 49. The flexible plastic strands, such as glass fiber strands, are unwound from the packages, 33, 34, after having previously been attached to one of the side cable elements, being wrapped around the side cable elements after the cellophane strips from the supply rolls 82 have been engaged on said side cable elements, as above described. The glass fibers 35, 36 are wrapped around the side cable elements in the manner illustrated in FIGURE 2 at a pitch angle determined by the adjusted position of the cross arm 18 relative to the rotating table 25, as above described. Since the side cable elements move upwardly, being driven by the motor 79 in the manner above described, additional layers of glass fibers are laid upon the opposite sides of the wound glass fibers 35, 36 from the supply packages 95 and 95', being fed against the wound glass fibers 35, 36 adjacent the roller 52. Thus, four layers of fibers are squeezed between the roller 52 and the large roller 49 at the region above roller 52, and simultaneously protective cellophane strips 103 and 106 are applied to the opposite sides of the compressed fiber layers. The composite laminar web is passed between the inner run of the endless belt 53 and the drum 49, being further compressed in the manner above described, while simultaneously being exposed to heat from the heaters 110. Eventually the cured, or partly cured, laminated material passes from between the end of the endless belt 53 adjacent the roller 54 and the drum 49, being wound on the take-up roll 112. The cutters 108 sever the protective cellophane strips 84 and the layer of fibers 35, 36 adjacent thereto in the manner illustrated in FIGURE 9 as the laminated material passes on the inside run of the endless belt from the bottom roller 52 to the large main roller 49, so that the laminated material is released from the respective side elements of cable 63 as said material moves onto the large roller 49, thus enabling the laminated material to freely leave the large roller adjacent the belt-supporting roller 54 and pass onto the take-up roll 112.

It will be noted that the use of the relatively small-diameter hollow bottom spindle or post member 15 permits the use of relatively small, and hence inexpensive, bearing assemblies 22 and 23.

It will be further noted that by the provision of the rotatable operator's platform 45, access is provided to any location around the table 25 to enable necessary operations or adjustments to be performed while the machine is operating, and whereby it is not necessary to shut down the machine to perform servicing operations or adjustments.

Also, the adjustability of the pulleys 64, 64 enables correct strand tension to be easily provided.

While a specific embodiment of an improved plastic laminate-making machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A machine for making laminated webs from overlapping filamentary strands comprising an upstanding vertical hollow support, a table journaled on said support, means rotating said table, a horizontal drum rotatably mounted above said support, a horizontal cross-arm mounted on the top of the support parallel to and spaced from said drum, respective guide means on said cross-arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and means to compress the layer of strands aganst the drum as the drum rotates.

2. A machine for making laminated webs from overlapping filamentary strands comprising an upstanding vertical hollow support, a table journaled on said support, means rotating said table, a horizontal drum rotatably mounted above said support, a horizontal cross-arm mounted on the top of the support parallel to and spaced from said drum, respective guide means on said cross-arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, means to compress the layer of strands against the drum as the drum rotates, and means to apply sufficient heat to the layers of strands on the drum to at least partly polymerize said polymerizable material.

3. A machine for making laminated webs from overlapping filamentary strands comprising an upstanding vertical hollow support, a table journaled on said support, means rotating said table, a horizontal drum rotatably mounted above said support, a horizontal cross-arm mounted on the top of the support parallel to and spaced from said drum, respective guide means on said cross-arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to apply additional plastic filamentary strands to at least one side of the wound strands as they approach the drum, means to sever the end loops of the wound strands adjacent the drum, whereby to release the strands from the cable elements, and means to compress the layers of strands against the drum as the drum rotates.

4. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to apply additional layers of plastic filamentary strands to opposite sides of the wound strands as they approach the drum, means to sever the end loops of the wound strands adjacent the drum, whereby to release the strands from the cable elements, and means to compress the layers of strands against the drum as the drum rotates.

5. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward portions of the cable elements between the first-named guide means and the drum, whereby the filamentary strands are wound continuously around said portions responsive to rotation of the table, means to cover the strands with polymerizable material before they are wound on the cable elements, means to apply additional plastic filamentary strands to at least one side of the wound strands as they approach the drum, means to cover said additional filamentary strands with polymerizable material before they are applied to the wound strands, means to sever the end loops of the wound strands adjacent the drum, whereby to release the strands from the cable elements, and means to compress the layers of strands against the drum as the drum rotates.

6. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward portions of the cable elements, between the first-named guide means and the drum, whereby the filamentary strands are wound continuously around said portions responsive to rotation of the table, means to cover the strands with polymerizable material before they are wound on the cable elements, means to apply additional layers of plastic filamentary strands to the opposite sides of the wound strands as they approach the drum, means to cover said additional filamentary strands with polymerizable material before they are applied to the wound strands, means to sever the end loops of the wound strands adjacent the drum, whereby to release the strands from the cable elements, and means to compress the layers of strands against the drum as the drum rotates.

7. A machine for making laminated webs from overlapping filamentary strands comprising an upstanding verticlal hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to apply additional layers of plastic filamentary strands to the opposite sides of the wound strands as they approach the drum, means to cover said additional filamentary strands with polymerizable material before they are applied to the wound strands, means to sever the end loops of the wound strands adjacent the drum, whereby to release the strands from the cable elements, means to compress the layers of strands against the drum as the drum rotates, and means to apply sufficient heat to the layers of strands on the drum to at least partly polymerize said polymerizable material.

8. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means to apply protective removable strips of flexible material to the portions of the cable elements between the first-named guide means and the drum as said cable elements pass upwardly from said guide means, means on the table to support a plurality of spools of plastic filamentary strands in spaced relation around the upstanding support, means to guide the filamentary strands toward said portions of the cable elements between the first-named guide means and the drum, whereby the filamentary strands are wound continuously around said portions in overlying relation to said strips responsive to rotation of the table, means to cover the strands with polymerizable material before they are wound on the cable elements, means to sever the end loops of the wound strands and said strips adjacent the drum, whereby to release the strands from the cable elements, and means to compress the layers of strands against the drum as the drum rotates.

9. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to apply layers of removable protective flexible material to the opposite sides of the wound strands as they approach the drum, means to sever the end loops of the wound strands adjacent the drum, wherby to release the strands from the cable elements, and means to compress the layers of strands against the drum as the drum rotates.

10. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to apply layers of removable protective flexible material to the opposite sides of the superimposed layers of strands as they approach the drum, means to sever the end loops of the wound strands adjacent the drum, whereby to release the strands from the cable elements, and means to compress the layers of strands against the drum as the drum rotates.

11. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means to apply removable protective strips of flexible material to the portions of the cable elements between the first-named guide means and the drum as said cable elements pass upwardly from said guide means, means on the table to support a plurality of spools of plastic filamentary strands in spaced relation around the upstanding support, means to guide the filamentary strands toward said portions of the cable elements, whereby the filamentary strands are wound continuously around said portions and the strips responsive to rotation of the table, means to cover the strands with polymerizable material before they are wound on the cable elements, means to apply additional layers of plastic filamentary strands to the opposite sides of the wound strands as they approach the drum, means to cover said additional filamentary strands with polymerizable material before they are applied to the wound strands, means to sever the end loops of the wound strands and the strips adjacent the drum, whereby to release the strands from the cable elements, means to compress the layers of strands against the drum as the drum rotates, and means to apply sufficient heat to the layers of strands on the drum to at least partly polymerize said polymerizable material.

12. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements upwardly at the same speed, means on the table to support a plurality of spools of plastic filamentary strands in spaced relation around the upstanding support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, respective supporting rollers rotatably mounted adjacent opposite sides of the drum parallel thereto, and an endless belt mounted on said supporting rollers and engaging over said drum and compressing the layers of strands against the drum as the drum rotates.

13. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, an endless cable extending through said hollow support, around said guide means, and extending drivingly over said opposite end portions of the drum, means drivingly engaging spaced side portions of the cable, said cable being crossed between the drive means and the hollow support, whereby the side portions of the cable between said first-named guide means and the drum are driven simultaneously at the same speed, means on the table to support a plurality of spools of plastic filamentary strands in spaced relation around the upstanding support, means to guide the filamentary strands toward the portions of the cable between the first-named guide means and the drum, whereby the filamentary strands are wound continuously around said portions responsive to rotation of the table, means to cover the strands with polymerizable material before they are wound on the cable portions, means to sever the end loops of the wound strands adjacent the drum, whereby to release the strands from the cable portions, and means to compress the layers of strands against the drum as the drum rotates.

14. A machine for making laminated webs from overlapping filamentary strands comprising an upstanding vertical hollow support, a table journaled on said support, means rotating said table, a horizontal drum rotatably mounted above said support, a horizontal cross arm mounted on the top of the support parallel to and spaced from said drum, respective guide means on said cross arm aligned with the opposite end portions of the drum, an endless cable extending through said hollow support, around said guide means, and extending drivingly over said opposite end portions of the drum, means drivingly engaging spaced side portions of the cable, said cable being crossed between the drive means and the hollow support, whereby the cable elements between the first-named guide means and the drum are driven simultaneously at the same speed, means on the table to support a plurality of spools of plastic filamentary strands in spaced relation around the upstanding support, means to guide the filamentary strands toward said cable elements, means to apply strips of removable protective flexible material to said cable elements as said cable elements pass upwardly from said guide means, whereby the filamentary strands are wound continuously around said cable elements and the strips disposed thereon responsive to rotation of the table, means to cover the strands with polymerizable material before they are wound on the cable elements, means to apply additional layers of plastic filamentary strands to the opposite sides of the wound strands as they approach the drum, means to cover said additional filamentary strands with polymerizable material before they are applied to the wound strands, means to sever the end loops of the wound strands and the protective strips adjacent the drum, whereby to release the strands from the cable elements, means to apply layers of removable protective flexible material to the opposite sides of the superimposed layer of strands as they approach the drum, respective supporting rollers rotatably mounted adjacent opposite sides of the drum parallel thereto, an endless belt mounted on said supporting rollers and engaging over said drum and compressing the layers of strands against the drum as the drum rotates, and means to apply sufficient heat to the layers of strands on the drum to at least partly polymerize said polymerizable material.

15. A machine for making laminated webs from overlapping filamentary strands comprising an upstanding vertical hollow suport, a table journaled on said support, means rotating said table, a drum rotatably mounted adjacent said support, a cross arm mounted on the support parallel to and spaced from said drum, respective guide means on said cross arm aligned with the opposite end portions of the drum, respective cable elements extending through said hollow support, around said guide means, and extending drivingly over said opposite end portions of the drum, means to simultaneously drive said cable elements toward the drum at the same speed, means on the table to support a plurality of spools of plastic filamentary strands in spaced relation around the support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and means to compress the layers of strands against the drum as the drum rotates.

16. A machine for making laminated webs from overlapping filamentary strands comprising an upstanding vertical tubular hollow support, a table journaled on said support, means rotating said table, a drum rotatably mounted adjacent said support, respective guide means aligned with the opposite end portions of the drum, respective cable elements extending through said hollow support, around said guide means, and extending drivingly over said opposite end portions of the drum, means to simultaneously drive said cable elements toward the drum at the same speed, means on the table to support a plurality of spools of plastic filamentary strands in spaced relation around the support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and means to compress the layers of strands against the drum as the drum rotates.

17. A machine for making laminated webs from overlapping filamentary strands comprising an upstanding vertical tubular hollow support, a table journaled on said support, means rotating said table, a drum rotatably mounted adjacent said support, respective guide means aligned with spaced portions of the drum, respective cable elements extending through said hollow support, around said guide means and extending drivingly over said spaced portions of the drum, means to simultaneously drive said cable elements toward the drum at the same speed, means on the table to support a plurality of spools of plastic filamentary strands in spaced relation around the support, means to guide the filamentary strands toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and means to compress the layers of strands against the drum as the drum rotates.

18. A machine for making laminated webs from overlapping filamentary strands comprising an upstanding vertical tubular hollow support, a table journaled on said support, means rotating said table, a drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between the first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and means to compress the layers of strands against the drum as the drum rotates.

19. A machine for making laminated webs from overlapping filamentary strands comprising an upstanding tubular vertical relatively small-diameter hollow support, a table journaled on said support, means rotating said table, a relatively large-diameter drum rotatably mounted adjacent said support, respective guide means aligned with spaced portions oft he drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions repsonsive to rotation of the table, means to cover the strands wtih polymerizable material before they are wound on the cable elements, means to sever the end loops of the wound strands adjacent the drum, whereby to release the strands from the cable elements, and means to compress the layers of strands of against the drum as the drum rotates.

20. A machine for making laminated webs from overlapping filamentary strands comprising an upstanding tubular vertical hollow support, a table journaled on said support, means rotating said table, a relatively large-diameter drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, and a relatively small-diameter drum rotatably mounted closely subjacent the first-named drum and supporting the cable elements as they are wound on said first-named drum so as to compress the layers of strands against the first-named drum as said first-named drum rotates and to progressively expel air from the layers as they are applied to the first-named drum.

21. A machine for making laminated webs from overlapping filamentary strands comprising an upstanding tubular vertical hollow support, a table journaled on said support, means rotating said table, a drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, means to compress the layers of strands against the drum as the drum rotates, an operator's platform adjacent the table, and means rotatably connecting said platform to said support so that the platform can be moved around the table and support.

22. A machine for making laminated webs from overlapping filamentary strands comprising an upstanding vertical hollow support, a table journaled on said support, means rotating said table, a drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, means to compress the layers of strands against the drum as the drum rotates, an operator's platform adjacent the table, means rotatably connecting said platform to said support so that the platform can be moved around the table and support, and means at times coupling the platform to the table so that the platform can be moved with the table around the support.

23. A machine for making laminated webs from overlapping filamentary strands comprising an upstanding tubular vertical hollow support, a table journaled on said support, means rotating said table, a drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions responsive to rotation of the table, means to cover the strands with polymerizable material before they are wound on the cable elements, means to sever the end loops of the wound strands adjacent the drum, whereby to release the strands from the cable elements, means to compress the layers of strands against the drum as the drum rotates, and means for adjusting the positions of the first-named guide means to provide adjustment of the tension of the filamentary strands as they are wound on said cable elements.

24. A machine for making laminated webs from overlapping filamentary strands comprising a vertical hollow support, a table journaled on said support, means rotating said table, a drum rotatably mounted adjacent said support, respective guide means aligned with spaced portions of the drum, respective cable elements extending through said hollow support around said guide means and extending drivingly over said spaced portions of the drum, means to simultaneously drive said cable elements toward the drum at the same speed, a source of filamentary strands on the table, means to guide the filamentary strands from said source toward the portions of the cable elements between said first-named guide means and the drum, whereby the filamentary strands are wound continuously around said portions responsive to rotation of the table, means to cover the strands with polymerizable material before they are wound on the cable elements, respective supply rolls of protective removable thin flexible strip material mounted adjacent said first-named guide means, means to feed the protective thin flexible strip material onto the cable elements as the cable elements move from said first-named guide means toward the drum to place the protective flexible strip material between the strands and the cable elements, means to sever the end loops of the wound strands and the protective flexible strip material disposed between the strands and the cable elements adjacent the drum, whereby to release the strands from the cable elements, and means to compress the layers of strands against the drum as the drum rotates.

References Cited
UNITED STATES PATENTS

| | | | |
|---|---|---|---|
| 3,340,128 | 9/1967 | Johnston | 156—426 |
| 3,041,230 | 6/1962 | Diehl | 156—181 XR |
| 2,954,817 | 10/1960 | Havemann | 156—169 |
| 1,195,951 | 8/1916 | Harrison | 156—427 |

PHILIP DIER, *Primary Examiner.*